United States Patent [19]
Gmür

[11] Patent Number: 5,121,638
[45] Date of Patent: Jun. 16, 1992

[54] METHOD AND DEVICE FOR RECORDING THE FLOW RATE OF A STREAM OF BULK MATERIAL

[75] Inventor: Bruno Gmür, St. Gallen, Switzerland

[73] Assignee: Buehler AG, Uzwil, Switzerland

[21] Appl. No.: 617,400

[22] Filed: Nov. 20, 1990

Related U.S. Application Data

[63] Continuation of Ser. No. 415,651, Oct. 31, 1989, abandoned, which is a continuation of Ser. No. 740,275, May 29, 1985, abandoned.

[30] Foreign Application Priority Data

Oct. 6, 1983 [CH] Switzerland .......................... 5437/83
Nov. 30, 1983 [DE] Fed. Rep. of Germany ....... 3343349

[51] Int. Cl.⁵ .............................................. G01F 1/00
[52] U.S. Cl. ....................................... 73/861; 177/114; 222/58
[58] Field of Search ........................ 177/14, 19, 24, 25, 177/50, 114; 222/55, 58, 71; 73/861

[56] References Cited

U.S. PATENT DOCUMENTS

| | | | |
|---|---|---|---|
| 3,001,397 | 9/1961 | Leonard | 73/861 |
| 3,135,427 | 6/1962 | Siegburg | 222/58 |
| 3,855,458 | 12/1974 | Motter et al. | 222/55 X |
| 4,366,872 | 1/1983 | Brunnschweiler et al. | 177/114 X |
| 4,448,272 | 5/1984 | Keller et al. | 177/25.19 X |
| 4,455,870 | 6/1984 | Jorritsma | 73/861 X |
| 4,457,750 | 7/1984 | Hill | 222/58 X |
| 4,458,539 | 7/1984 | Bilstadt et al. | 73/296 X |
| 4,513,830 | 4/1985 | Persbeck et al. | 177/114 X |
| 4,552,235 | 11/1985 | Brunnschweiler | 177/114 X |
| 4,580,698 | 4/1986 | Ladt et al. | 222/55 |
| 4,716,768 | 1/1988 | David et al. | 177/50 X |

Primary Examiner—Herbert Goldstein
Attorney, Agent, or Firm—McAulay Fisher Nissen Goldberg & Kiel

[57] ABSTRACT

The invention proposes a novel weighing method and a device for exactly determining the weight of a continuous stream of bulk material. The stream is conveyed without interruption into a tubular weighing machine (1). A blocking slide valve (4) is cyclically closed and opened and the weight increase per unit time is measured, the slide valve (4) being closed in each case, and an average is obtained from a very large number of weighing operations repeated in the same manner, and is used by computer means (5) for calculating the entire amount of bulk material. The weighing cycle is very short, in some cases less than 10 seconds, and is continuously repeated. The large number of measurements gives high statistical accuracy of about ±0.02%, i.e. of the same order as for a container-type weigher.

9 Claims, 7 Drawing Sheets

METHOD AND DEVICE FOR RECORDING THE FLOW RATE OF A STREAM OF BULK MATERIAL

This application is a continuation of application Ser. No. 415,651, filed Oct. 31, 1989, now abandoned which is a continuation of Ser. No. 740,275 filed May 29, 1985 now abandoned.

TECHNICAL SECTOR

The invention relates to a method of recording the flow rate of a stream of bulk material supplied to a weighing machine, the outlet of which is repeatedly locked and opened, and a device for performing the method.

PRIOR ART ON WHICH THE INVENTION IS BASED

In processing plants it is frequently necessary in practice, for various reasons, to record the flow rate of a stream of bulk material in a conveyor line. For example it may be necessary to record the exact amount of material flowing during a certain processing time, or to control the stream of bulk material to obtain an exact flow rate per unit time. The main devices used hitherto have been bulk-material weighers and conveyor-type weighers. In the case of operations inside the firm only, the requirements on the quality of measurements are not usually very high. As a rule, however, the stream of bulk material should if possible not be interrupted, or not for long, during the measurement. In the particular case of mills, recently use has been made of large numbers of momentum-meters, as disclosed e.g in DE-C-2609167 or DE-C-2342668.

A stream of bulk material falling on to a conventional weighing machine does not initially give a useful measurement, since it is impossible without special devices to make an exact separation between (a) the momentum of the stream of falling bulk material recorded by the weighing machine, which can fluctuate from one time to another, and (b) the weight of bulk material already on the machine. In the known methods of measuring the flow rate by momentum meters, the vertically falling stream of material is deflected. The deflection produces a horizontal force component proportional to the amount of material instantaneously falling on to the deflector plate so that a measurement of this force component gives information about the flow rate of bulk material. The measurement can then be used for adjusting the flow rate to a desired value, by using suitably coupled metering devices. The advantage of the known method is that the continuous flow of bulk material is not interrupted by the measurement and the flow continues unaltered after falling on the measuring device. Also, the momentum meters are much cheaper to manufacture than earlier weighing systems (e.g. batch or conveyor-type weighers). However, momentum measurements have the disadvantage of not being very accurate. The method is practically incapable of eliminating disturbing factors such as temperature or humidity in the air or material, and the results may therefore deviate in practice by a range of ±1%. If there are extreme fluctuations in friction between the product and deflector plate, the error may even be more than 1%.

Such errors in measurement cannot be reconciled with the effort to use electronic computers to control and monitor the conveyance of bulk material, if possible even in large mills. In a mill with a daily output of 500 t, for example, a 1% error in measurement will correspond to a total error of 5 t in the actual amount of bulk material, which will make it impossible to control the mill by computer.

DE-A-960 132 describes a method of measuring the flow rate of a stream of bulk material in which the material falling out of the supply pipe is deflected in to a bypass, where it is introduced into a weighing machine disposed in a pipe cross-section. The machine has an openable bottom which initially covers the cross-section of the weighing container, so that the falling product piles up on the bottom. The valve for deflecting the bulk material from the main pipe to the bypass or weighing pipe is coupled to a timer so that after a preset time the product is shut off from the bypass and released into the main pipe. The weighing machine is connected to a device for indicating the weight of supplied material, so that the operator can see how much material has entered the weighing container during the known, preset time, thus immediately giving the flow rate in the main conveying pipe. The weighing-machine bottom can then be mechanically re-opened so as to discharge the product, after which the bottom is re-closed and the process repeated. This known method is capable in principle of delivering measurements indicating the flow rate of product, but has some important disadvantages. Firstly, the inflow of material on to the machine has to be interrupted for weighing (i.e. by changing over the feed to release the main pipe), which is fundamentally undesirable. The known method is also very slow, since it uses a mechanical weighing system which must operate with relatively long weighing times which depend on the cyclic operation of the mechanical slide valve for connecting or disconnecting the main stream. The result is that the total process has a relatively long cycle time which cannot be reduced. The weighing accuracy is also inadequate, since the tare weight of the container is a disturbing influence which cannot be adequately taken into account. If any product sticks to the container at the beginning of the weighing process, the initial weight will vary in a non-negligible manner, but the variation will not be taken into account when determining the weight. As before, this prior art is incapable of yielding measurements for computer control of an entire large mill system, e.g. for exact mixing of various grades of product or for controlling the amounts of products and operating sequences.

DISCLOSURE OF THE INVENTION

The object of the invention therefore is to devise a method of determining the flow rate of product with an accuracy of less than ±0.2%, the method being of use even when the supply of product is uninterrupted, and thus attaining the accuracy of industrial weighing machines so that the measurements are sufficiently accurate for computer-controlled monitoring of a flow of product. Another object is for the expense to be kept particularly low.

To this end, according to the invention, in the case of a method of the initially-mentioned kind, in the case of a continuously inflowing product, the machine forms at least two measurements which, after the machine outlet has been blocked, are offset relative to one another by a short reference time and are picked up at the machine and electronically recorded, the reference time being delayed by at least the stabilization time after the machine outlet has been blocked and being chosen during the general period of undisturbed increase in the measurements by the machine and the measurements being used to calculate a ratio for the increase in weight per unit time (i.e. for the flow rate, e.g. m) of the bulk material during a weighing operation.

Even in the case of varying products, the method according to the invention avoids separate measurement of momentum, i.e. the problems occurring in existing measuring systems for evaluating momentum and the disadvantageous effects on measurement of variations in friction or peripheral influences such as changes in temperature and humidity. The known systems cannot accurately measure momentum if they are to maintain a continuous flow of product, whereas the method according to the invention reduces inaccuracy to such an extent that, as in normal calibrated industrial weighing machines, an accuracy of $\pm 0.2\%$ or even $\pm 0.1\%$ can regularly be obtained without difficulty. Admittedly, the known weighing containers eliminate the momentum of the falling product and can give greater accuracy than for measurements of momentum alone, but they need corresponding waiting times or a bunker to store the product during the waiting time, which is completely eliminated by the method according to the invention. In the method according to the invention, unlike the method in DE-A-960 132, it is not necessary for the flow of material continuously moving in the conveying pipe to be interrupted for measurement by bypassing a part of the stream and shutting off the main pipe. The method according to the invention can without difficulty be applied to the main pipe itself, without using a bypass, and without at any time interrupting the continuous supply of material to the balance, thus completely eliminating the other previously-mentioned disadvantages.

A number of experiments and theoretical calculations were made in an attempt to determine the boundary conditions. Variation of the fall height in a range of 2-3 meters had no influence on the accuracy of the result. The tests were made on a rather small unit, the weighing vessel having a capacity of about 10 liters. At present we cannot find any basis for using the same method for determining both very small and very large streams of product.

The lowest limit depends on the resolution of the weighing machine, which in practice is particularly dependent on vibration of the building. For practical reasons, a one-liter vessel would be too small.

One very important feature of the invention is that a reference time is chosen which lies completely within the undisturbed increase in the value measured by the weighing machine. During the first moment of the weighing process, when the machine outlet is blocked, the movement of the various components (e.g. slide valves) is a disturbing factor. Initially the product strikes the weighing vessel directly, but the situation immediately changes in that the product forms a cushion. The initial cushion-forming period therefore includes a number of disturbing factors, [but] even under very rough conditions a relatively equilibrium state of filling, relative to disturbing environmental factors, is obtained after 0.2 to 0.5 seconds. At any time thereafter (during the undisturbed increase in the measured value), measurements can be made by the machine and used for calculating the increase in weight per unit time. Various attempts have been made at a purely theoretical determination of the weighing principle, but they have all failed because the conversion of momentum (as energy) into a force is dependent on the time factor. The time to slow down the falling stream of product can be determined only by empirical approximation. During the filling of a vessel, the stream of product rises to meet the falling stream, resulting in "rising momentum". Under unreal conditions, if the horizontal cross-section of the weighing vessel were approximately equal to the cross-sectional area of the stream of falling product, the falling momentum and the rising momentum would both be of the same order of magnitude. However, practical tests have shown that even this error factor is at least below the required accuracy of $\pm 0.1\%$, since at least two measurements are shifted from one another by the reference time and expressed in a ratio. The rising/falling momentum factor can be neglected in a cylindrical weighing vessel having a cross-sectional area many times as great as that of the incident stream of products. Once a cushion of product is present, the conditions of incidence of the falling stream of product remain constant to a high degree. There are also practical reasons for not basing measurements on the last 10-20% of the filling height of the weighing vessel. Tests have shown that a filling range of about 20-80% can be assumed to be undisturbed. As can be seen, the invention also makes it completely unnecessary to determine the tare weight of the empty measuring container separately.

An essential, central idea of the invention is that the stream of product flows in uninterruptedly, i.e. continuously. This is the special feature of momentum-measuring systems. All traditional container-type weighers, however, have to interrupt the stream of product to determine the exact weight alone, thus interrupting the inflow of product and also making it necessary to wait for the machine to stabilize. The tests have shown that the measuring system according to the invention is insensitive even to wide fluctuations in the mass flow. Here, however, a distinction must be made between two basic groups of problems.

If the actual stream of product has to be controlled, a suitable mechanical device has to be provided in front of the weighing system. If very accurate control is aimed at, an accurate regulator such as a precision metering device must be used. It is then found that the undisturbed increase in measured value is completely linear. This means that the reference time can be made very small, e.g. 0.05 to 0.2 seconds. In view of the inertia of mechanical control elements, these are almost instantaneous actual values or control signals for correcting the metering adjustment when necessary. Another result of the very short measurement is that the beginning of a disturbance can be immediately detected and adjusted, at least in the right direction, depending on the control process. In this manner the mass flow can be adjusted with surprisingly high constancy, which is particularly advantageous for mixing processes or for adding a liquid component to a stream of bulk material.

The second group of problems relates to exact determination of a given stream of product which cannot be influenced by control systems. In this case the instantaneous or longer-term flow rate needs to be determined for short periods or for longer times. In the case of bulk materials, unlike water, it is very difficult to obtain a really constant stream without using special apparatus. Periodic fluctuations occur, depending on the speed of rotation of the frequently-used screw or charging-valve metering devices. In this case the invention can be used to determine small fluctuations by appropriately increasing the reference value, e.g. to 1-5 seconds. The measurement may also be repeated as required to determine fluctuations in output over a longer period. Even with large fluctuations in output, the total mass flow (including the periods where no weighing is in progress) can be determined with the required accuracy of ±0.2% by statistical averaging.

In the method according to the invention, the momentum of the falling stream of product is included in the recorded weight, but under the inventive conditions it has surprisingly been found that the problem momentum does not distort the measured values, so that the actual flow rate can be determined with surprisingly high accuracy. More specifically, this means that the new method very accurately gives the instantaneous mass flow or, in a corresponding graph (FIG. 2), the mass flow in kg versus time in seconds or the rising angle $\alpha$. Depending on the particular case, the measurement can be obtained as a simple number, e.g. a corresponding number of volts, or calculated in kg/min or t/h. It is proposed to make measurements during a very short reference time, the duration of which is advantageously in the range from 0.05 to 10 seconds and particularly advantageously between 0.2 and 7 seconds. However, reference times below 0.05 seconds can be used if there is an absolutely constant supply and there are no environmental disturbances to the operation of the mill.

In conjunction with electronic weighing also assisted by the invention (i.e. the weighing system very rapidly delivers the required instantaneous values), this ensures that a highly accurate measurement can be made within a time short enough for practically neglecting any remaining interfering difference between the momentum at the beginning and end of the measuring period which should theoretically be calculated as the residual influence of the momentum when determining the difference in values. The high accuracy of the resulting numerical ratio is due to the fact that measurements according to the invention are made during the time of undisturbed, on average linear, increase in measured instantaneous values after the disturbances due to the first incident momentum directly on to the vessel bottom and the locking of the vessel outlet, etc., i.e. after the weighing machine has stabilized.

In an advantageous embodiment of the method according to the invention, a number of reference intervals can be provided in succession between blocking and releasing the weighing machine outlet, thus yielding individual pairs of values (weight/time) for calculating or determining the average weight increase per unit time (=average flow rate). In one advantageous form of the method, the average flow rate can be calculated after recording the first reference time interval. The reference time interval is chosen during the same weighing operation and the average flow rate is calculated. In the case of a control system, a signal can then be derived for metering the stream of product. A third reference time interval will give a very accurate value for the stream of product and the outflowing stream will also be very accurately determined. This embodiment is particularly suitable for the beginning of a first weighing series, at the start of a stream of product, particularly if the stream also has to be controlled.

Even extreme variations in the stream of bulk material can be exactly determined if use is made of electronic weighing machines, operating independently of the distance travelled, which can not only determine the instantaneous weight but also integrate or evaluate sequences of measurements during the measuring period. The advantage of using a weighing machine of this kind according to the invention is that, instead of simply obtaining the difference between two measurements at the beginning and end of the reference time, the curve in between can be integrated. This, starting from the measurement at the beginning of the reference time, can be used to determine a corrected measurement for the end of the reference time, corresponding to a linear rate of increase in the measured value, having an integral area (with reference to time) exactly corresponding to the integral area of the measured increase in value within the reference time, thus representing the highest possible accuracy of a correspondingly averaged rising angle $\alpha$ or m, so that even with relatively wide fluctuations in the stream of product the actual value can be exactly determined and the total mass flow can be relatively accurately found, as before.

In a specially advantageous embodiment, the time between two successive weighing operations can be freely chosen depending on the constancy of the stream of bulk material. Advantageously the machine outlet is blocked at the start of the stream of bulk material or the beginning of the first weighing operation. It is particularly advantageous to have a large number of weighing operations, e.g. several hundred or several thousand in a few hours, and statistically calculate the average weight increase per unit time or the flow during the entire time, the resulting average corresponding to the actual flow with the previously-mentioned accuracy of below ±0.2%. In many cases it is not essential to empty the weighing container between one weighing operation and the next.

There is a particularly advantageous embodiment of the inventive process, in the case where a number of reference time intervals are provided and recorded, yielding differences from which an average value can be calculated. The advantage is that the time between two successive reference intervals is shorter than the duration of a single reference interval.

In another advantageous embodiment of the method according to the invention, the calculated flow rate is converted into a control signal which is supplied as a set value to a flow-rate control device at the product inlet. This can ensure a constant preset or desired flow rate during the operation of an efficient control circuit in the feed pipe.

The process according to the invention can be controlled so as to determine the absolute amount of supplied product instead of the flow rate over a time, provided that all the means for interrupting the stream of product are also present. To this end, in an advantageous embodiment of the method according to the invention, the calculated flow rate and a measurement of the time after closing the machine outlet are used for continuously calculating the amount of conveyed bulk material. The continuous timing signal can be returned to zero or to its initial value after each successive closing of the machine outlet, thus determining the amount of material in each filling. If for example a throughput of exactly 5 t of bulk material, e.g. flour or grain, is required, the last 100 or 200 kg can be measured separately. In another advantageous embodiment, the method according to the invention can also be used for precisely controlling the individual amount filling the container, by forming a control signal corresponding to the amount of conveyed bulk material and using it to control the closing of the machine outlet. This provides a simple method of ensuring that the outlet is always promptly opened when an exact required amount has entered the weighing container. A suitable control logic can be used to detect and eliminate influences such as the opening time or the continuous supply of product during the opening time, so that the amount of product delivered downwards has exactly the right or desired value, depending on the given conveying conditions.

The device according to the invention is based on a device for recording the flow rate of a stream of bulk material, comprising a weighing machine having an inlet and a discharge pipe for the material, the machine outlet being blockable and openable at the discharge pipe. To this end, according to the invention, the weighing machine is an electronic machine, a controllable bulk-material blocking device is disposed at the machine outlet, and a device is provided for repeatedly determining the weight of a continuous inflow of bulk material on to the weighing machine during a short reference time, when the bulk-material blocking device is in the closed position.

The device according to the invention is of simple construction and can be relatively small. It does not need to be relatively long, like conveyor-type weighers, and so saves considerable expense and reduces the cost of manufacture.

The device according to the invention has the great advantage that, in an advantageous embodiment, the machine can comprise a weighing container constructed as part of the actual conveying line, thus saving considerable space and improving the usefulness of the device according to the invention. Advantageously the weighing container is given an inner cross-section having a shape corresponding to the inner cross-section of the supply pipe or the discharge pipe. This has the great advantage that the space for the product to run through in the weighing machine is completely similar to the spaces in the supply and the discharge pipe, thus avoiding any disturbance to the flow of product and permitting self-cleaning.

Particularly advantageously, the weighing container in the device according to the invention has a cylindrical flow chamber having a height of 1.5 to 5 times its diameter.

In another advantageous embodiment of the device according to the invention, a blocking slide valve is actuated via a pneumatic cylinder controlled by a computer via an electro-pneumatic transducer, a slide valve being movable at a controllable speed of opening, which will always enable the delivery of material to be made uniform at the end of a weighing cycle.

Advantageously the weighing vessel has a simple cylindrical shape which can be blocked or opened at the bottom by a slide valve controllable by electronic computer means. Alternatively use can be made of a weighing trough inserted into the stream of product for each weighing operation. As before, measurements must not be made until the initial interference time has elapsed.

In another advantageous embodiment of the device according to the invention, a metering device is provided in the supply pipe to the weighing machine and is connected to a means for setting a preselected continuous flow rate; advantageously also, a computer for actuating the device can be provided and is controlled by the output of the device for determining the flow rate of bulk material in the weighing machine, the computer, control device, metering device and device for determining the flow rate co-operating to form a flow-rate control system. Advantageously the metering device will be a rotary slide valve for easily-flowing materials or a metering screw for difficultly-flowing materials (particularly advantageous).

Advantageously also, in the case of a device according to the invention, the space immediately under the weighing machine is connected to the space immediately above by a lateral pressure-equalizing pipe.

Another advantage is that the device according to the invention need not be used only in a vertical conveyor pipe but also can be inserted in a sloping pipe. In that case the weighing container will be incorporated at a slope similar to that of the bulk-material pipe, i.e. so that the central axes of the two coincide or are at least parallel. This sloping arrangement has the advantage of permitting direct or subsequent installation into existing silo systems with a number of compartments, without increasing the height.

The invention will now be explained in detail with reference to the drawings, given by way of example, in which.

Figure 6:
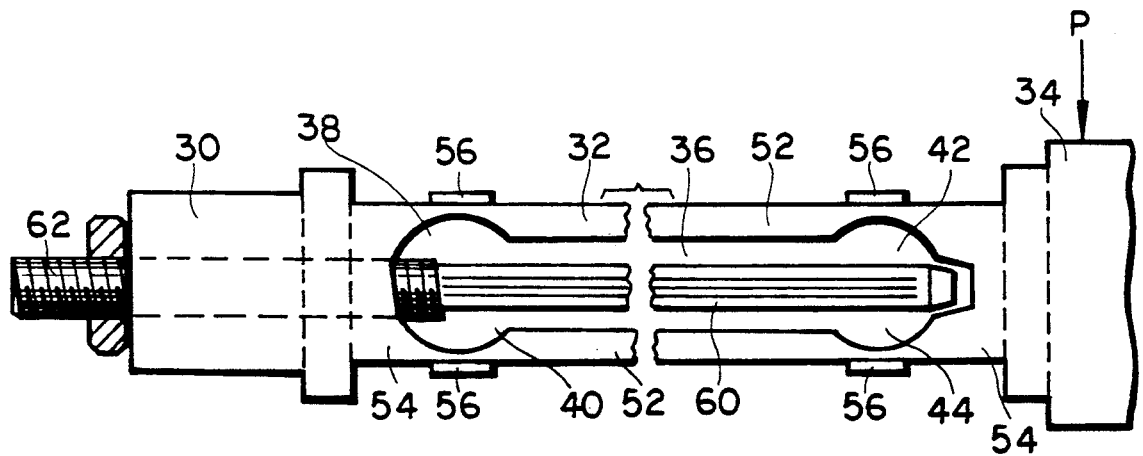
Figure 7:
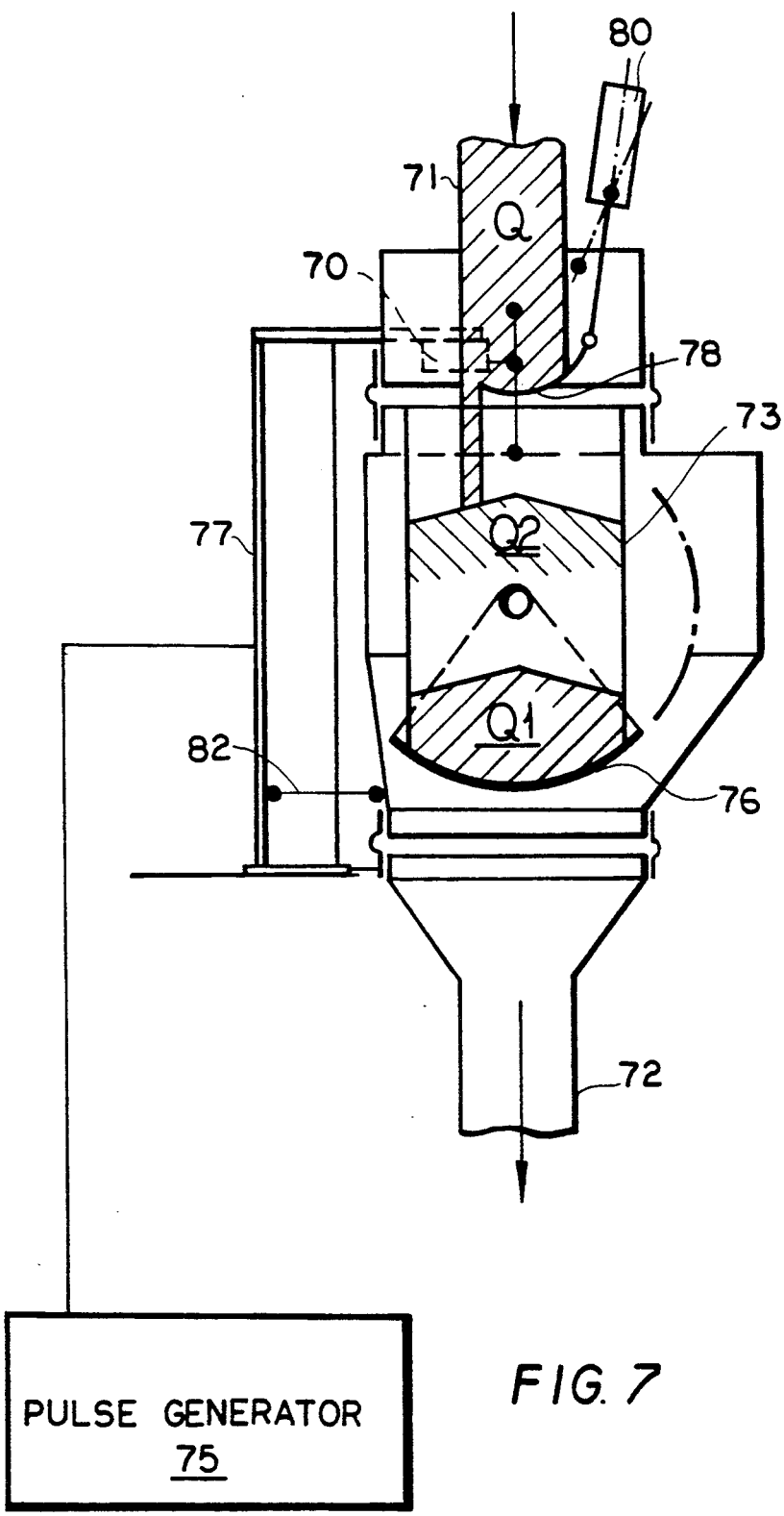
Figure 8:
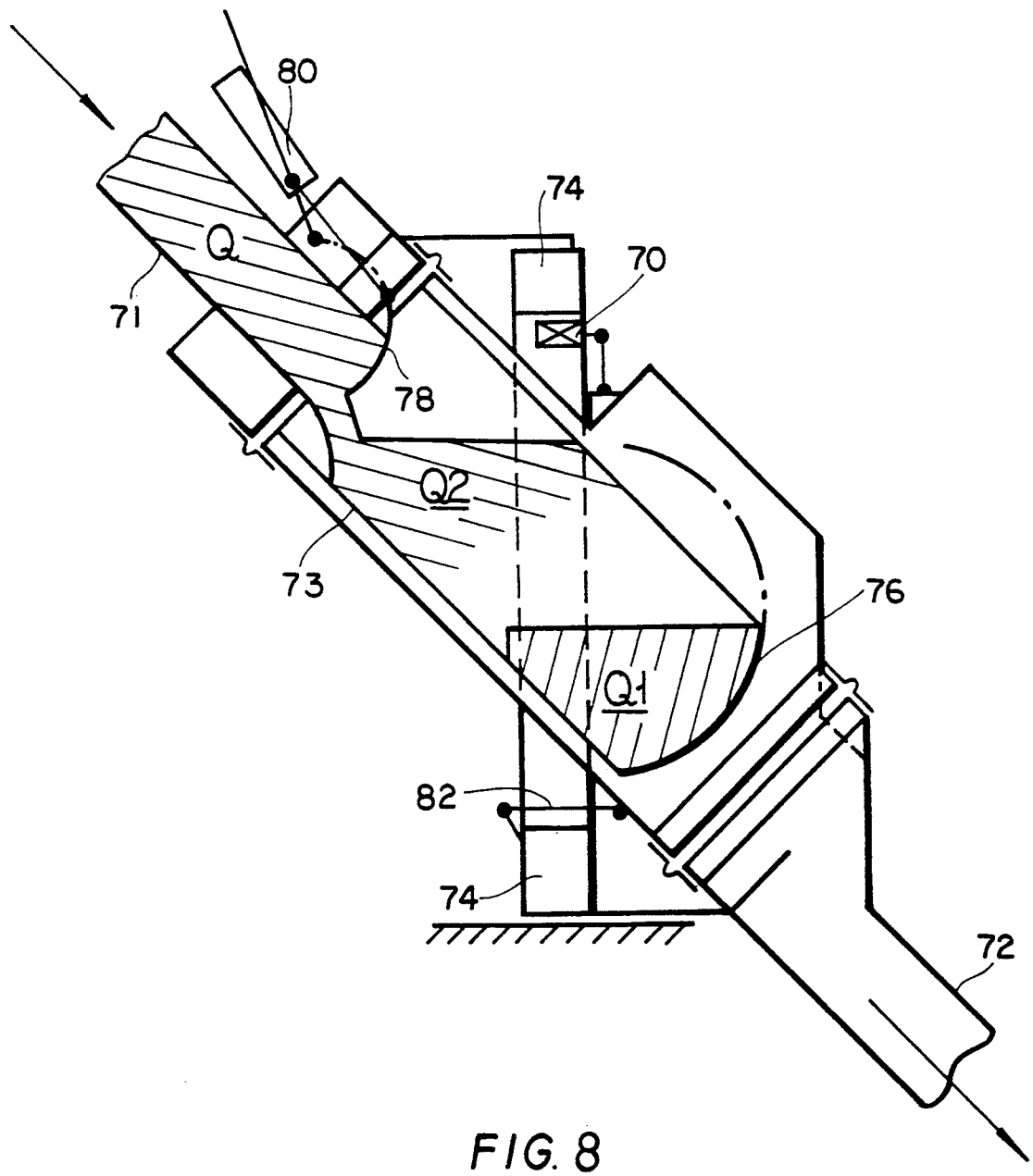

FIG. 6 snows a strain-gauge weighing-beam for use in a device according to the invention;

FIG. 7 is a diagram of a device according to the invention used in a vertical conveying pipe, with a slide-valve control means in the inlet pipe, and FIG. 8 is a block diagram of a device according to the invention disposed in a sloping conveying pipe, with facilities for controlling a slide valve for the inlet pipe.

Figure 1:
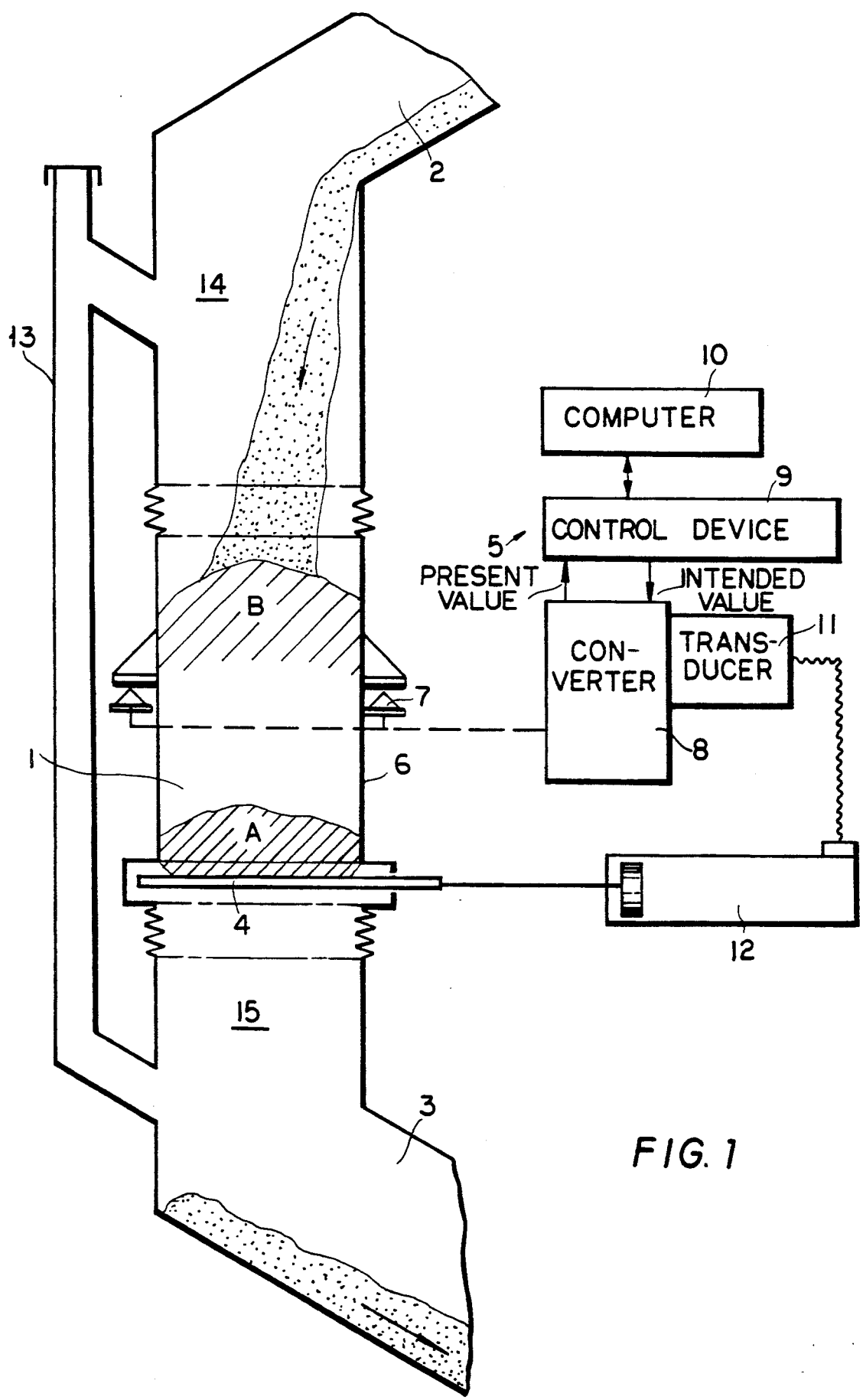
FIG. 1 is a diagram of the main components of a device according to the invention.

FIG. 1 is a diagram of a weighing device having a supply pipe 2 in its top region, a tubular weighing machine 1 in its middle region and a discharge pipe 3 at its bottom region. Machine 1 has a blocking slide valve 4, for closing or opening the machine outlet. There is also a computer unit 5 for evaluating the measurement signals supplied by the weighing device.

The main part of machine 1 is a weighing container 6, mounted on pressure cells 7 or other components suitable for rapidly recording instantaneous weights. In the diagram, container 6 is disposed and designed as part of the actual conveyor pipe, i.e. it has a flow space having the same cross-section as the supply pipe 2 or discharge pipe 3. This ensures that the product arriving from pipe 2 can flow into pipe 3 without being disturbed by the inner cross-section of container 6.

Pressure cells 7 generate a signal corresponding to the measured weight and deliver it to a converter 8 connected by a control device 9 to a computer 10. Converter 8 is also connected to an electro-pneumatic transducer 11 connected to a pneumatic cylinder 12 for controlling the cyclic operation of machine 1. The illustrated system can be used for simple electronic recording of the measured weights and transmitting them to computer 10 in order to calculate the desired flow rate of product (i.e. amount per unit time). There is also a pressure equalizing tube 13 for excluding disturbances produced by differences in pressure between pipe 2 and pipe 3. To this end, tube 13 connects a space 14 directly above container 6 to a space 15 directly below it, the connection being unobstructed independently of the position of slide valve 4.

Figure 2:
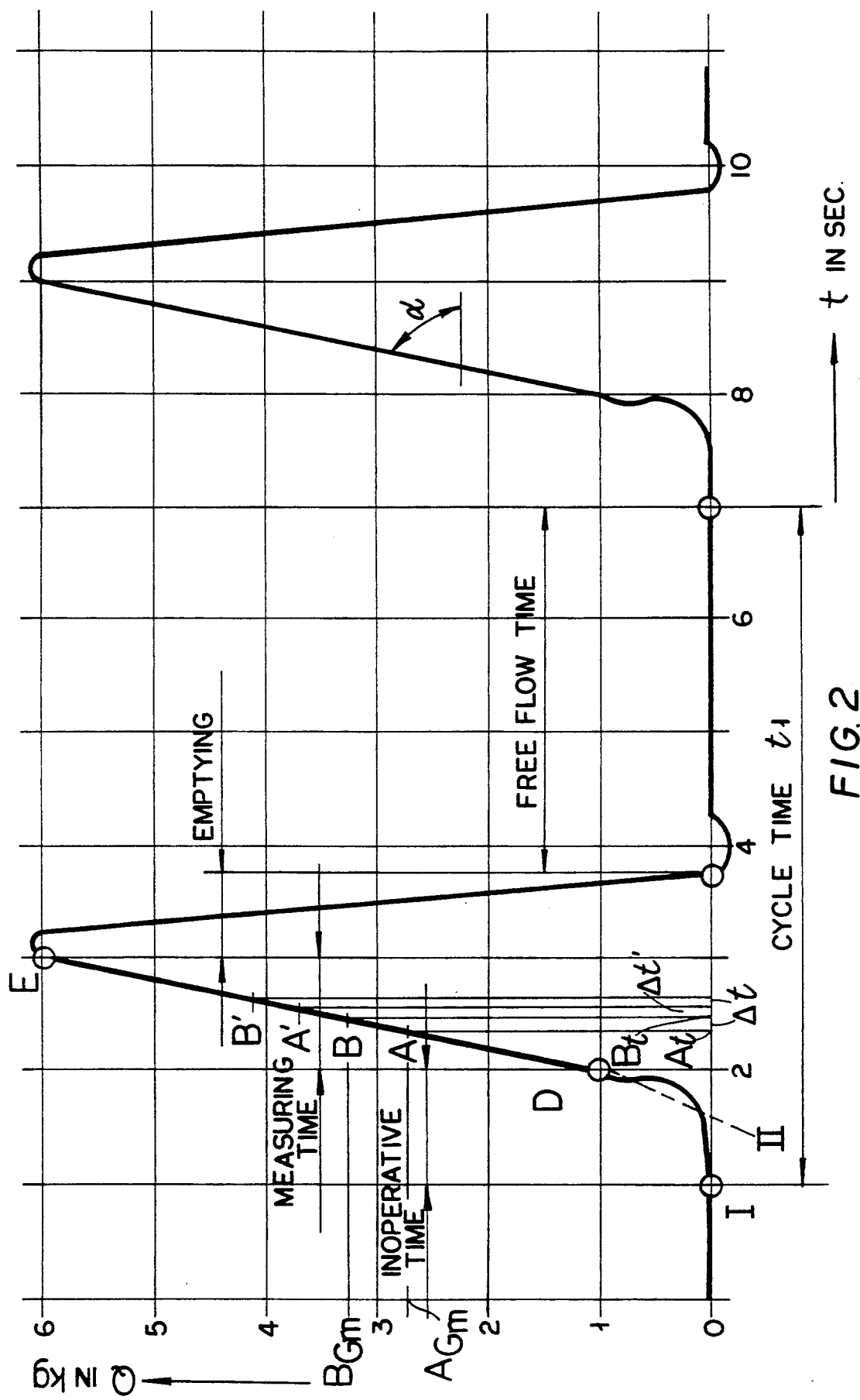
FIG. 2 shows the variation in the measured weight of bulk material per unit time during a weighing cycle, using the method according to the invention.

FIG. 2 shows the variation of the measured increase in weight Q (in kg) with respect to time t. The time I denotes the closing time of the machine outlet, i.e. the completion of the process of closing the slide valve 4. It is assumed that the flow of bulk material into machine 1 is continuous.

When slide valve 4 closes (time I), container 6 begins to fill. At first, the resulting weight signal is somewhat irregular, corresponding to the curve from the starting point I, and rises with perceptible overshoots, because at this stage the entire weighing system is made to vibrate by the initial impact momentum, resulting in the overshoot. A good damping system, however, can produce stabilization, corresponding approximately to point D, after a short time (about 1 second in the example). After point D there is a linear increase in the measured values up to point E, at which slide valve 4 is opened. The product runs out and the weight in machine 1 falls to zero, which may even result in a short negative weight signal owing to the inertia of the weighing machine. The slide valve then remains open for a time until being re-closed. After closing (i.e. after the machine outlet has been re-closed or slide-valve 4 has finished moving in the closing direction) the entire process in FIG. 2 is repeated.

One important feature of the inventive method is that during the range of linear increase in measured value, i.e. in the range between the stabilization point D and the end point of the linear increase in weight E when the slide valve begins to open, the measurements required for the inventive method are made with simultaneous recording of time. Let point $A_t$ be the time associated with the measuring point A, where $A_{Gm}$ is the weight deflection measured by the machine. $B_t$ denotes the time associated with measuring-point B and let $B_{Gm}$ be the measured deflection for the weight (weight deflection) determined at point B. During the continued inflow of bulk material, a measurement always includes the weight and simultaneously includes the momentum of the stream of falling product. An individual measurement, therefore, can never represent the absolute weight of the bulk material which has accumulated in that instant in container 6.

Within the previously-mentioned linear range of measured weight increase, a measurement is now made, e.g. between points A and B, over a very short reference time $\Delta t$. Since the process is very brief, we can assume that the change in momentum between point A and point B is so extremely small that it can be neglected. Consequently, when calculating the difference between values $A_{Gm}$ and $B_{Gm}$ and when the reference time is made very short, the proportion of momentum included in the resulting differential value can be regarded as negligible compared with the total signal and therefore, even if high accuracy is required, the value is sufficiently accurate for use as the difference in weight between the times $A_t$ and $B_t$.

If the weight of material flowing into the machine per unit time is called the "flow rate of bulk material", it is obtained from the relation between the calculated differential value and the reference time as follows, where the expression: $\Delta G/\Delta t$ can also be given as the secondary mass flow m or as the rising angle (or tan $\alpha$:

$$\frac{B_{Gm} - A_{Gm}}{B_t - A_t} = \frac{\Delta G}{\Delta t}$$

In this expression, $\Delta G$ denotes the difference in weight and $\Delta t$ is the duration of the reference time.

Measurement of the curve during the reference time $\Delta t$ therefore gives a short-time measurement from which the instantaneous flow rate of bulk material can be calculated without difficulty, very quickly and with high accuracy. Also, as shown likewise in FIG. 2, during the linear increase in measured value between points D and G a similar measurement can be made in another reference time between points A' and B' as well as during the reference time A-B. If the reference time $\Delta t$ is made the same as between points A and B, the flow rate calculated from the second measurement can be compared with the flow rate measured during the first reference time and, if there is a discrepancy, an average can be obtained which then with even greater accuracy represents the average flow rate between times $A_t$ and $B'_t$. If suitable weighing systems are used, there will be no difficulty in making a number of such measurements during the linear increase between points D and E, each during an identical reference time $\Delta t$. and after each new measurement the previously-determined flow rate can be corrected by again taking the mean.

Besides calculating the instantaneous flow rate, the reference time $\Delta t$ and the measurement of the difference in weight $\Delta G$ can also be used, if required, to calculate the total filling of container 6 until emptying, and the total weight of product supplied to container 6 between time I and time E, likewise with great accuracy. This can easily be done if the difference in weight $\Delta G$ measured within a reference time is suitably linearly extrapolated and computer-forecast, so as to calculate the difference in weight between (a) point E and (b) the intersection II between the linear increase in measurement and the abscissa (time axis). The resulting difference in weight will be a very exact record of the weight of bulk material which has actually flowed into the container, as can best be confirmed by experiment. If measurements are made by an electronic weighing machine which can also integrate the measurement curve with respect to time, it will even be possible for the actual curve, measured by a suitable electronic circuit for calculating the flow rate or the weight of material fed into the container, to be replaced by a curve comprising a straight line extending e.g. through point E, where the integral with respect to the time between point E and its intersection with the abscissa is equal to the integral of the actually-measured curve with respect to the time between points I and E.

Figure 3:
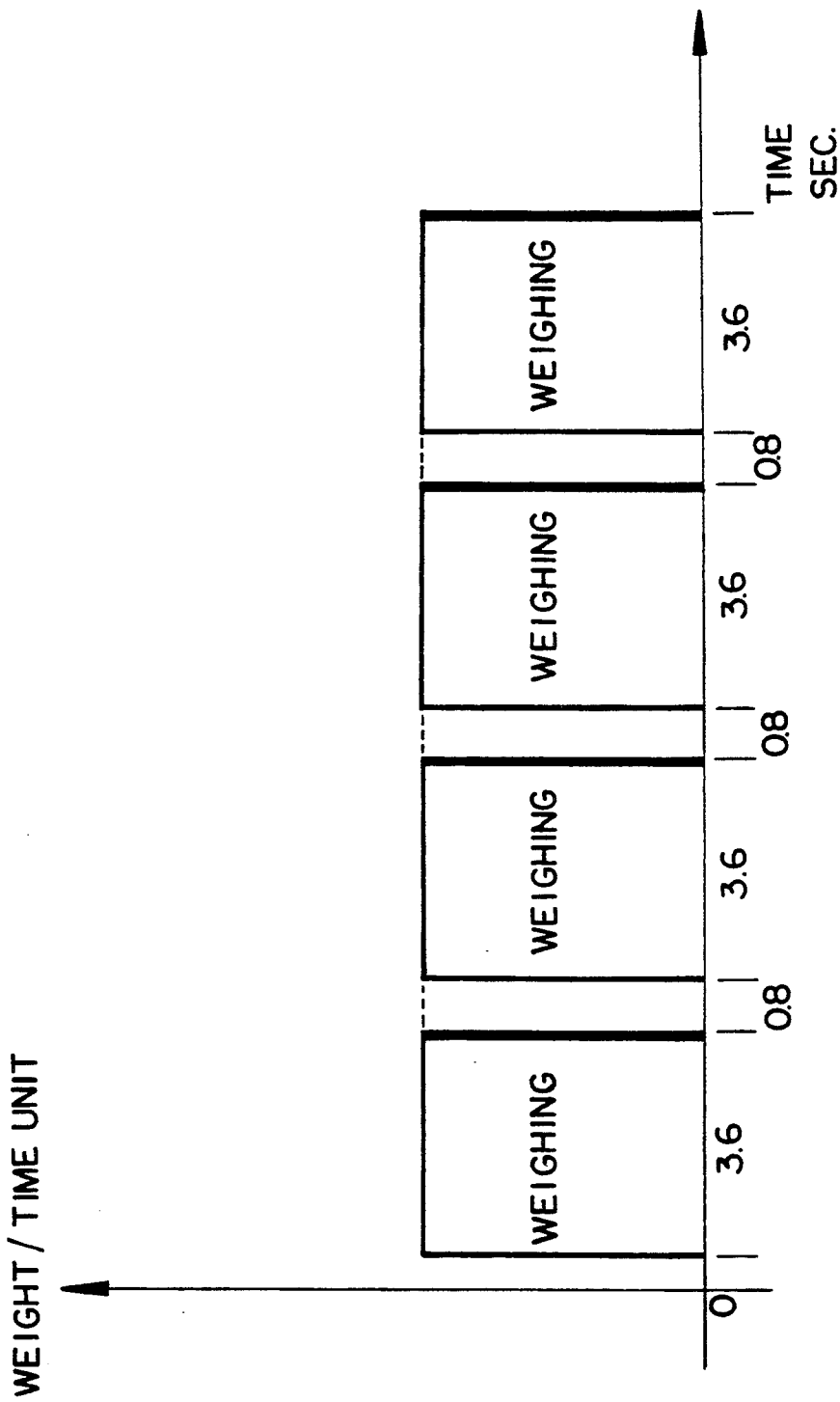
FIG. 3 is a diagram showing a number of successive reference times during the linear increase in the measured weights (during a weighing cycle)

FIG. 3 illustrates the possibility of carrying out a number of weighing operations or cycles within a preset longer time. The operations described as "weighing" may be either complete successive weighing cycles over a longer period, or individual reference times during a single weighing cycle. An increase in individual measurements, either during a weighing cycle or by increasing the number of cycles over a longer period, results in continuously improved and more accurate measurements through recording a larger number of individual values and the possibility of obtaining statistically improved values by averaging.

Figure 4:
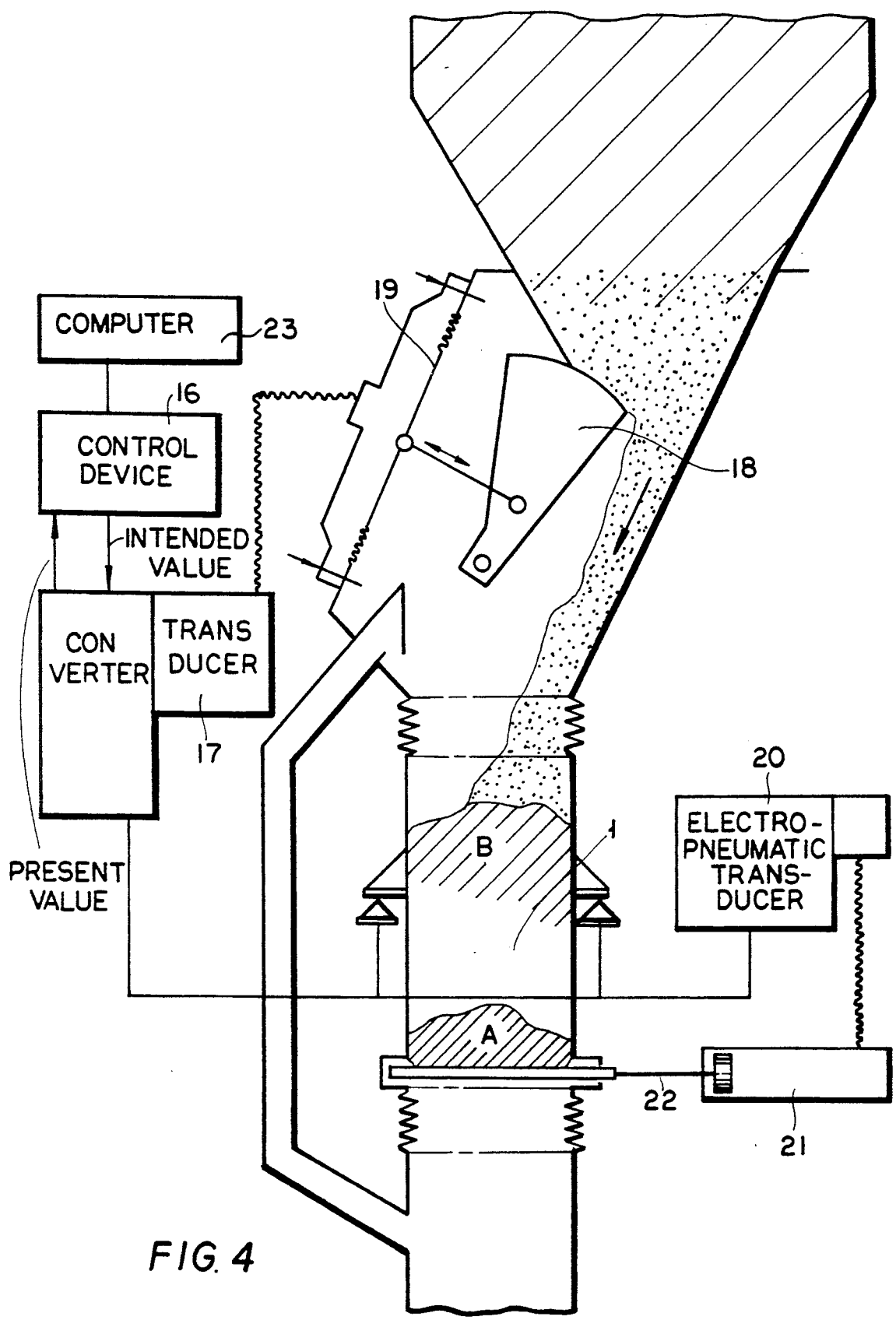
FIG. 4 is a block diagram showing the inventive process combined with continuous control of flow rate.

FIG. 4 shows another diagrammatic embodiment of the invention which has the additional function, besides measuring the weight or flow rate of a continuous stream of bulk material, of preselecting, setting and even regulating a desired flow rate. To this end, the illustrated device comprises a computer 23 and a control unit 16 connected via a first electropneumatic transducer 17 and a pneumatic force diaphragm 19 to a metering device 18, and via a second electro-pneumatic transducer 20 to a pneumatic cylinder 21 and a blocking slide valve 22. A weighing machine 1 (identical with that shown in FIG. 1) performs both the functions as aforementioned. The open position of metering element 18 is adjusted during each reference time Δt and corrected at each repeated measurement. The flow rate determined on each occasion is compared with a control value and the desired throughput is continuously adjusted by element 18. In the case of difficultly-flowing materials, element 18 may also be a variable-speed metering screw.

FIG. 6 is a diagram of a strain-gauge weighing beam which can be used for recording measurements in a device according to the invention. It comprises a rigid girder 30, a transverse beam 32 and a flange 34 for transmitting a force P acting on it. Beam 32 is made of resilient material and constructed as a four-bar system. To this end it has a dumb-bell cross-section aperture 36, formed at the centre of beam 32 more particularly so that the longitudinal axis of the aperture coincides with that of beam 32. The centre part of aperture 32 has a rectangular cross-section, whereas the portion corresponding to the "weights" of the dumb-bell has a circular cross-section. Each circular-section part of aperture 36 corresponds to two moving joints 38, 40 and 42, 44. These portions will hereinafter therefore be called "moving joints 38, 40, 42 and 44". When a force P acts on flange 34, beam 32 is deformed substantially at its four moving joints 38 to 44. Beam 32 is held stationary to a rigid base 26 via girder 30.

Aperture 36 is bounded longitudinally by two end members 54 and transversely (substantially) by two beam-like bending elements 32 disposed symmetrically to the longitudinal axis of beam 32. The end members each join a pair of opposite ends of element 52. The resulting structure of beam 32 is therefore substantially a parallelogram.

Electronic transducer elements 56 are secured at those places on the outer surfaces of elements 52, facing away from one another, which are most strongly deformed by a force P acting on beam 32. Since these spaces are the moving joints 38 to 44, elements 56 are secured to those portions of the outer surfaces of elements 52 which are above or below the moving joints. Preferably, elements 56 comprise strain gauges, and two of them also have compensation resistors if required.

Figure 5:
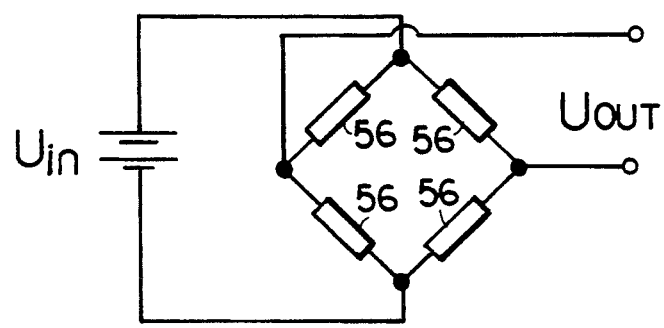
FIG. 5 shows a circuit for measuring the forces on a weighing machine used in the device.

Transducer elements 56 are connected in a bridge circuit in conventional manner as in FIG. 5. The input of the bridge circuit is supplied by a voltage $U_{in}$, and the circuit outputs a signal $U_{out}$ corresponding to the force measurement. Elements 56 can comprise a compensation resistor and a strain gauge connected in parallel or in series, or a combination of the parallel and series circuit.

The device in FIG. 6 also has a safety rod 60 which bears beam 32 if overloaded, the rear end 62 of rod 60 being rigidly connected to girder 30 and the end portion 54 of beam 32 secured thereto. In other respects, the purpose and construction of rod 60 is irrelevant to the description of the invention.

FIGS. 7 and 8 diagrammatically show a device according to the invention in practical use in a vertical conveyor line (FIG. 7) and in a sloping conveyor line (FIG. 8). In FIGS. 7 and 8, like references denote like structural elements.

In FIG. 7, a supply pipe 71 to a weighing container 73 and a discharge pipe 72 are disposed vertically, whereas in FIG. 8 the direction of conveying is sloping. A weighing machine (not given a reference number in FIGS. 7 and 8) is disposed between the supply and discharge pipes.

In supply pipe 71, a stream of product Q arrives in front of the weighing machine. The end of pipe 71 has a regulating slide valve 78 which can be moved by a motor 80, in order to make the required adjustment in the stream of material entering container 73.

A blocking slide valve 76 is disposed at the bottom of container 73 and can be pivoted from a closed position (shown in continuous lines in FIGS. 7 and 8) into a lateral open position (chain-dotted in FIGS. 7 and 8) to empty the container 73, whereupon the material (Q2) heaped in container 73 can be discharged into pipe 72.

Container 73 in FIG. 7 is suspended by a diagrammatically-indicated measuring device 70 from a frame 77, using suitable stabilizers 82 to prevent undesired movement. FIG. 8 comprises a stand 74 which is used as before for securing the weighing-machine casing or the casing of container 73, via a suitable measuring device 70. As before, suitable stabilizers 82 are used for stabilizing the position of the weighing machine. Device 70 can be any measuring device suitable for rapid (electronic) recording of the differences in weight, e.g. a strain-gauge measuring device as shown in FIGS. 5 and 6.

Of course, the devices diagrammatically shown in FIGS. 7 and 8 are intended for a device according to the invention comprising suitable electronic means for measurement, control and regulation operations required in the method according to the invention. Such means are indicated purely diagrammatically at 75 in FIG. 7 only. Means 75 are used (in a manner not shown in FIG. 7) for receiving, processing and transmitting all required signals. More particularly, signals can be recorded by pick-up 70, and slide valve 76 and motor 80 can be suitably actuated by means 75.

The product Q supplied through pipe 71 is introduced into container 73 in accordance with the position of slide valve 78. When valve 76 is closed, the product falls on to valve 76, where it accumulates at a rate depending on the supply. As soon as valve 76 has completely closed, the electric measuring signal continuously delivered by device 70, which measures the weight of product which has accumulated at a given time in container 73, is delivered to device 75, which integrates it with respect to time. At a time corresponding to time A in FIG. 2, a given starting amount Q1 has accumulated in container 73. The increase in weight in product inside container 73 is then determined for a short reference time Δt at the end of which the amount of product in container 73 will be Q2. In FIGS. 7 and 8 the actual increase in Q1 relative to Q2 is shown greatly out of scale, for ease of comprehension. In reality the relative differences in level are much smaller. The process can then be repeated a number of times if necessary until finally the valve 76 is brought into its lateral open position by a pulse through device 75, after which the material in container 73 is discharged downwards into pipe 72. Slide valve 76 remains open for a certain time, during which the container 73 can usually be completely emptied. The opening and closing times of container 73 are advantageously preselected to correspond to the setting devices under the given operating conditions. The opening or closing rate of valve 76 may also be variously adjusted or preset.

I claim:

1. A device for recording the throughput of a bulk material product continuously flowing through a conveying pipe, said device comprising:

an electronic weighing machine including a weighing container positioned in said conveying pipe and having an inlet into which said product is continuously supplied and an outlet from which said product is discharged, said weighing container forming part of the conveying pipe and having an inner cross-section corresponding in shape to an inner cross-section of a supply portion of said conveying pipe;

a discharge pipe connected to said outlet to receive the discharged product;

controllable first means disposed at said outlet and being movable between a first position to close said outlet and prevent the product from being discharged therefrom, and a second position to open said outlet to permit said product to be discharged therefrom; and second means for repeatedly determining the weight of a non-interrupted inflow of said product into the machine during a predetermined reference time selected during a general period of undisturbed increase in weight of said bulk material in said machine when the first means is in the first position by performing two successive weight measurements and computing a ratio of the increase in weight of continuously in flowing bulk material per unit time, said reference time being selectable in a range where, at one end, substantially instantaneous mass flow monitoring is desired, to a time, at the other end, where fluctuations in the flow of the bulk material is continuously determined.

2. A device according to claim 1, wherein the weighing container has a cylindrical flow space the height of which is 1.5 to 5 times its diameter.

3. A device according to claim 1, wherein said first means includes a slide valve actuated by a pneumatic cylinder controlled by a computer via an electropneumatic transducer.

4. A device according to claim 1, further including a metering device provided in a supply pipe to the weighing container and connected to a control device for setting a preselected continuous flow rate.

5. A device according to claim 4, wherein a computer is provided for actuating the control device and is actuated by an output of a device for determining the flow rate of bulk material in the weighing machine during a reference time, the computer, the control device, the metering device and the device for determining the flow rate forming a flow-rate regulating means.

6. A device according to claim 4, wherein the metering device is a rotary slide valve.

7. A device according to claim 4, wherein the metering device is a metering screw.

8. A device according to claim 1, further comprising a lateral pressure-equalizing pipe which connects a space immediately above the weighing container to a space immediately below the weighing container.

9. A device according to claim 1, wherein the weighing container has an inner cross-section corresponding in shape to the inner cross-section of a discharge pipe of the conveying pipe.

* * * * *